March 21, 1933.  E. P. BLACKMAN ET AL  1,902,611
CARRIER FOR CABLE AND WIRE REELS
Filed Oct. 16, 1931  2 Sheets-Sheet 1

INVENTORS
Carl P. Blackman
Leon D. Blackman

March 21, 1933.  E. P. BLACKMAN ET AL  1,902,611
CARRIER FOR CABLE AND WIRE REELS
Filed Oct. 16, 1931  2 Sheets-Sheet 2
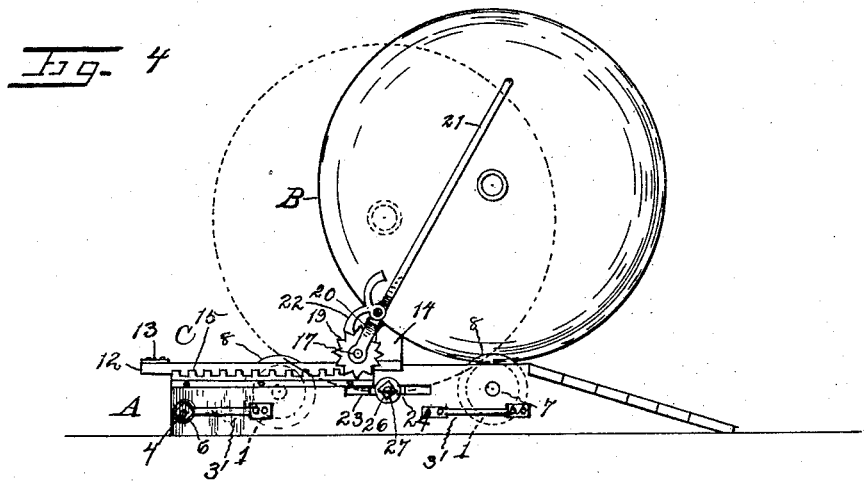
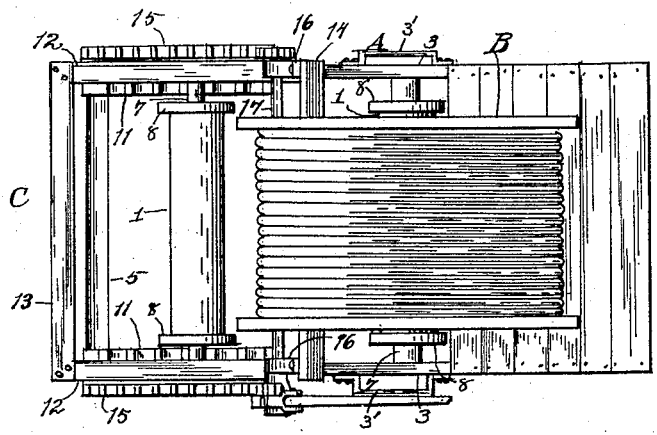
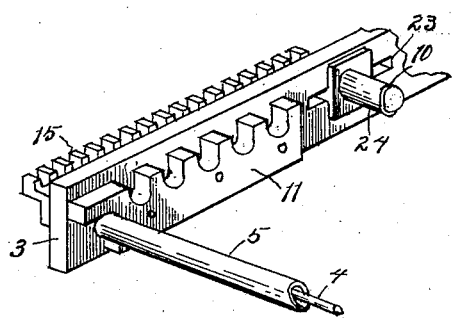
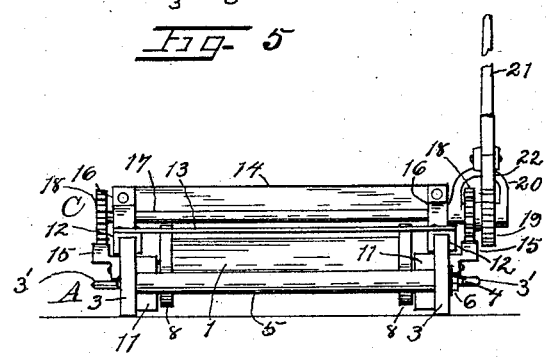

Patented Mar. 21, 1933

1,902,611

UNITED STATES PATENT OFFICE

EARL P. BLACKMAN AND LEON D. BLACKMAN, OF BATTLE CREEK, MICHIGAN; SAID EARL P. BLACKMAN ASSIGNOR TO SAID LEON D. BLACKMAN

CARRIER FOR CABLE AND WIRE REELS

Application filed October 16, 1931. Serial No. 569,300.

The present invention has reference to means for holding reels, on which wire or cable is coiled, while such cable or wire is being either coiled or uncoiled, in the operation of stringing the same.

Amongst other objects of the present invention, is to so construct a device for the purpose, whereby cumbersome timbers for the construction of jacks, and supports for holding such reels, can be obviated; whereby the device for holding reels of small and medium sizes, can be readily handled by less labor than when the customary jack is used; whereby the reel carrier when used on loose and soft ground, can be shimmed up and supported for the reception of a reel much more readily, and better than can be done with jacks ordinarily used; whereby the carrier can be repeatedly used for its purpose, and whereby a reel of either wire or cable can be readily uncoiled, or coiled, when mounted on a carrier of the kind. These, and other objects and advantages, will be readily comprehended by linemen and others familiar with handling cable and wire, whether for use overhead, or underground stringing.

In the drawings, forming a part of these specifications:—

Fig. 4 is a modified form of a reel holder with a reel mounted thereon, preparatory to lowering it onto the rear roller of the carrier.

Fig. 5 is a plan view of Fig. 4.

Fig. 6 is a rear view of the reel holder.

Fig. 7 is a broken left hand rear section of the carrier frame.

Figure 1:
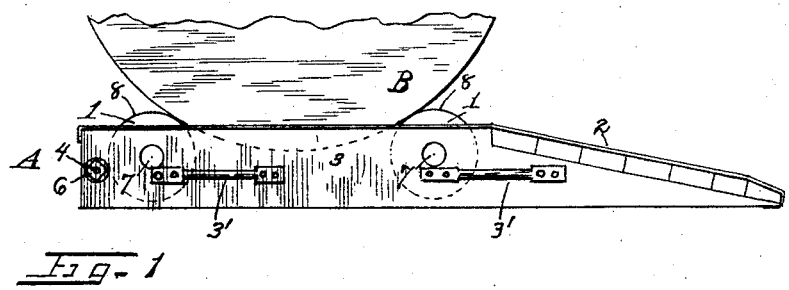
Fig. 1 represents a side view of a reel holder with a coil of cable mounted thereon.

In the drawings, like marks of reference, refer to corresponding, or equivalent parts, in the different views, in which: A, represents a framework, in which two flanged ended rollers 1, 1 are mounted in spaced parallel relation transverse of said frame, and 2 represents an inclined tramway, or decking, leading from the forward end of the carrier, to a point forward of, and about on a plane with the upper surfaces of the rollers 1, 1. The forward roller, should be in close proximity to the upper edge of the decking, as shown.

The framework comprises two longitudinal side pieces 3, connected at the rear ends by means of a straining rod 4, running through a spacing piece of tubing 5, between the frame sides. The rod 4, has a head at one end, and a customary nut 6, at its opposite end, threaded upon said rod.

As shown in Fig. 1, the rollers 1, 1, are mounted on shafts 7, placed in suitable receiving holes in the frame sides. These rollers by preference, are fitted with ball, or roller bearings, in a customary manner, and roll about the shafts, for the purpose of lessening friction, when loaded with a reel of cable or wire. In using the device, to mount a spool or cable of wire, the framework is placed on the ground in a substantially level position, and the spool is rolled upon the inclined tramway 2, and seated upon the rollers 1, 1, between the flanged ends 8.

Figure 2:
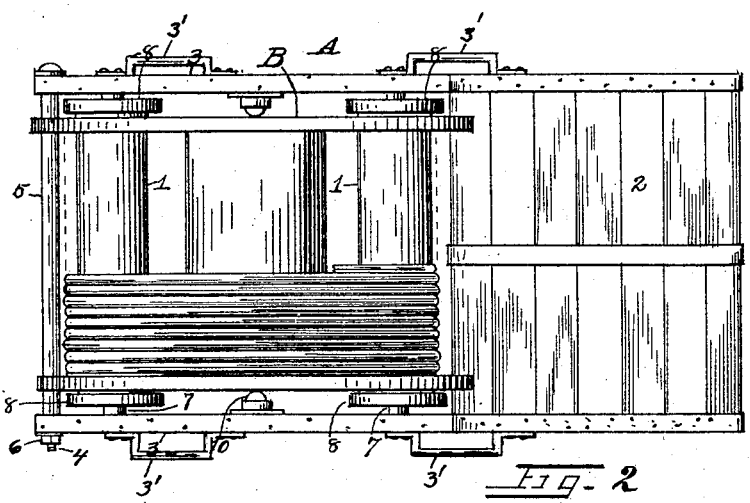
Fig. 2 is a plan view of Fig. 1, with a part of a cable and its spool removed, to show the rolls on which the spool is mounted.
Figure 3:
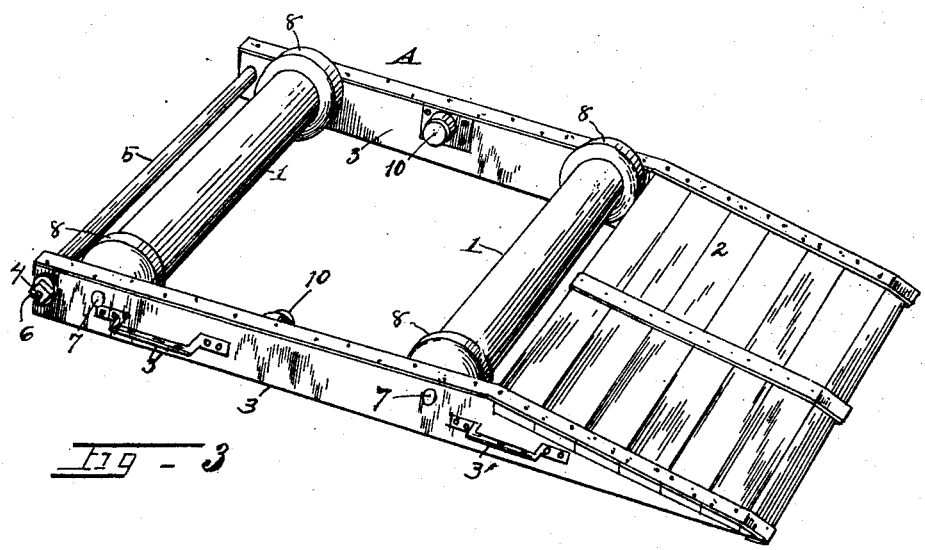
Fig. 3 is a perspective view of a reel holder.

The flanges 8, at the ends of the rollers are for the purpose of guiding such reels as may be placed thereon, and in order to prevent friction, to some extent, at the ends of reels carried on said rollers, ball bearing castors 10, are oppositely positioned upon the inner of the frame sides of the carrier and intermediate the reel supporting rollers 1, 1, as shown in Figs. 2, 3 and 7.

In Figs. 2 and 3, these castors are not adjustable, whilst in Figs. 4, 5, 6 and 7, they are adjustably mounted to accommodate the adjustable rear roller, in the modified type of reel carrier. In the modified form of carrier, as shown in Figs. 4, 5, 6 and 7, the framework A, has within its rear side portions, oppositely disposed fluted rear roller supports 11. These supports or carriers, are fluted from their upper edges, and into the recesses of the same, the axle or shaft ends of the rear roller is placed when it is expedient to move said roller to and from the forward roller.

When a small spool of cable or wire, is placed upon the carrier, the rear roller is placed forward, in its holders in parallel relation to the forward roller, in a manner whereby the space between the rollers will be shortened, to prevent the spool from dropping too low between said rollers, and whereby said spool may be more readily rolled whilst being either wound or unwound.

In order that large and heavy spools of cable or wire, may be easily and readily moved rearwardly on the carrier, and not be suddenly tipped from the forward roller onto the rear roller, a sled like framework C, is placed upon the upper edges of the carrier sides 3, to receive the spool, as shown in Fig. 4. This sled like frame is formed of two inverted channel shaped pieces 12, a rear crosspiece 13, and near its forward end carries a raised tapering topped crossbar 14. The channel portion of the frame seats upon the upper edges of the carrier sides A. When it is desired to seat a large or heavy coil or spool of cable between the rollers 1, 1, as shown in Figs. 4 and 5, the framework C, is slid or placed forward on the carrier A, with its forward end in close proximity to such roll, with its cross bar 14, bearing against such roll or spool. In this position, the frame is ready to be moved rearwardly, and permit said spool to be lowered onto the rear roller, from which position it may be readily handled.

To minimize time and labor in drawing the frame C, rearwardly when loaded with a spool, or reel of wire or cable, a lever and ratchet mechanism has been provided.

As shown in Figs. 4, 5, 6 and 7, on the rearward outer sides of the carrier pieces, racks 15, are attached, and rearward of the reel or spool holding crosspiece 14, oppositely disposed brackets 16, are secured to both the channel sides 12, of the frame C and to said crosspiece.

Through the brackets 16, a shaft 17, is journaled. This shaft at one end extends far enough beyond the side of the carrier to permit a gear 18, a ratchet wheel 19, together with a yoke 20, to be attached thereto. The opposite end of the shaft is fitted with a corresponding gear, both of which gears mesh with the racks 15.

To move the frame C, either rearward or forward, on the carrier A, a portable handle 21, is used in a socket extension of the yoke 20. On this handle a weighted curved pawl 22, is pivotally attached to engage the teeth of the ratchet wheel 19. To move the frame rearward on the carrier, the lever with its pawl faces the rear of the carrier as shown in Fig. 4, and to move the frame forward on the carrier, a reversal of the lever and pawl is made, the portable lever and pawl, operating the ratchet wheel in a customary manner.

The framework C, is portable, and can be readily removed from the carrier A, by lifting the same therefrom when necessary. This framework may be made to freely slide upon the carrier, by placing hard grease upon the upper edges of the frame pieces 3, of the frame A, or by placing the same within the grooved or channelled side pieces of the framework C. The carrier to facilitate the winding, or unwinding of a reel of cable or wire, is provided with oppositely disposed ball bearing castors 10. These castors, when small reels or spools are used, may be directly attached to the inner faces of the carrier sides, as shown in Figs. 2 and 3, and when larger reels or spools are used, the castors may be arranged to be adjustable for accommodating such spools or reels. As illustrated in Figs. 4, 5 and 7, longitudinal slots 23, are formed in the carrier sides, rearwardly of the front roller, and in these slots, castor ended brackets 24, are slidably fitted. These castors are adaptable to assist in guiding the reels, operating upon the rollers 1, 1, by contact with the reel, or spool ends. To adjust and secure these castors, when used with adjustable brackets, bolt extensions 26, protrude from the brackets outwardly through washers, on the outer faces of the carrier sides, and upon the threaded ends of these extensions, nuts 27, are run in a customary manner. These castors, when in operating position on the carrier, should be arranged to lie centrally between the rollers 1, 1, so as to evenly direct and keep the spools or reels in proper position for either winding or unwinding.

From the foregoing description, taken in connection with the drawings illustrating our invention, a more extended exploiting of the reel carrier is believed will not be necessary.

Having therefore described our invention, what we claim as new and desire to secure by Letters Patent, is:—

1. In a reel or spool carrier, oppositely disposed parallel narrow rectangular side pieces adapted to seat on their lower edges, said pieces sloping downwardly and outwardly from their upper narrow edges, a tramway mounted upon said sloping portions a flanged ended roller journalled to the rear and in close proximity to the upper rear edge of said tramway, a secondary flanged ended roller journalled in spaced parallel arrangement to said first named roller, in said side pieces, and ball bearing castors longitudinally adjustable between said rollers on the inner side faces of said side pieces above the axles of said rollers.

2. In a reel or spool carrier, the combination with a parallel sided framework having a downwardly and outwardly sloping forward end with a tramway mounted thereon, reel holding rollers in said frame to the rear, and parallel to the rear edge of said tramway, and in spaced relation to one another, the rear roller being adjustable toward and from its opposite roller, a slidable frame portably mounted upon said carrier, a crossbar mounted upon the forward end of said frame, and means to slide said frame on said carrier.

3. In a reel or spool carrier, the combination with a parallel sided framework having a downwardly and forward sloping forward end with a tramway mounted on said end, a stationary flanged ended roller journalled to lay in close proximity to the rear edge of said tramway, and an adjustable flanged ended roller mounted in spaced parallel relation to said first mentioned roller to the rear thereof, open topped fluted side pieces attached to the inner faces of said parallel sided framework to the rear of the center of said framework, said adjustable roller adapted to seat with its center shaft within opposite flutes of said fluted side pieces.

4. In a reel or spool holder, the combination with parallel side pieces connected at both ends, a stationary flanged ended roller journalled in the forward end of said side pieces, and a portable and adjustable flanged ended roller journalled in parallel relation thereto rearward thereof, a framework slidably mounted upon said side pieces, a reel holding crossbar mounted at the forward end of said framework, a cross shaft journalled to the rear of said crossbar, gear racks carried at the outer sides of said side pieces, spur gears meshing with said racks mounted on said cross shaft, a ratchet wheel mounted on said shaft at one end, a yoke carried on said shaft, a lever portably carried in said yoke, and a pawl carried by said lever to actuate said ratchet wheel.

5. In a reel or spool holder, in combination with a parallel sided framework, a flanged ended roller journalled in the forward end of said framework, and a flanged ended roller journalled in said framework in spaced parallel relation thereto, and adjustably arranged to be moved either to or from said first mentioned roller, said framework having longitudinal slots between said rollers, brackets longitudinally mounted in said slots, ball bearing castors carried on said brackets between the inner sides of said framework and means to adjustably secure said brackets in said slots.

6. In a reel or spool holder, the combination with a parallel sided framework, a flanged ended roller journalled on a shaft in one end of said framework, a flanged ended roller journalled on a shaft in parallel relation to said first named roller in spaced relation thereto, ball bearing castors carried upon the inner faces of said framework between said rollers, said bearings being approximately on a line at their outer bearing ends with the inner surfaces of the flanges of said rollers.

EARL P. BLACKMAN.
LEON D. BLACKMAN.